United States Patent
Shi et al.

(10) Patent No.: US 12,406,418 B2
(45) Date of Patent: Sep. 2, 2025

(54) PERSONALIZED TEXT-TO-IMAGE GENERATION

(71) Applicant: ADOBE INC., San Jose, CA (US)

(72) Inventors: Jing Shi, San Jose, CA (US); Wei Xiong, San Jose, CA (US); Zhe Lin, Clyde Hill, WA (US); Hyun Joon Jung, Monte Sereno, CA (US)

(73) Assignee: ADOBE INC., San Jose, CA (US)

( * ) Notice: Subject to any disclaimer, the term of this patent is extended or adjusted under 35 U.S.C. 154(b) by 120 days.

(21) Appl. No.: 18/476,504

(22) Filed: Sep. 28, 2023

(65) Prior Publication Data
US 2024/0355022 A1   Oct. 24, 2024

Related U.S. Application Data

(60) Provisional application No. 63/497,353, filed on Apr. 20, 2023.

(51) Int. Cl.
*G06T 11/60*   (2006.01)
*G06T 7/194*   (2017.01)
*G06T 9/00*    (2006.01)

(52) U.S. Cl.
CPC ............ *G06T 11/60* (2013.01); *G06T 7/194* (2017.01); *G06T 9/00* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 11,922,550 B1* | 3/2024 | Ramesh | G06F 40/284 |
| 2019/0279074 A1* | 9/2019 | Lin | G06F 16/583 |
| 2020/0151222 A1* | 5/2020 | Mannar | G06F 16/951 |
| 2020/0250537 A1* | 8/2020 | Li | G06F 18/22 |
| 2020/0311542 A1* | 10/2020 | Wang | G06N 5/02 |
| 2020/0380027 A1* | 12/2020 | Aggarwal | G06F 16/538 |
| 2022/0036127 A1* | 2/2022 | Lin | G06T 11/00 |
| 2022/0130499 A1* | 4/2022 | Zhou | G06V 10/25 |

(Continued)

OTHER PUBLICATIONS

Gal, et al., An Image is Worth OneWord: Personalizing Text-to-Image Generation using Textual Inversion, arXiv preprint arXiv:2208.01618v1 [cs.CV] Aug. 2, 2022, 26 pages.

(Continued)

*Primary Examiner* — Jason A Pringle-Parker
(74) *Attorney, Agent, or Firm* — F. CHAU & ASSOCIATES, LLC

(57) ABSTRACT

One or more aspects of a method, apparatus, and non-transitory computer readable medium include obtaining an input description and an input image depicting a subject, encoding the input description using a text encoder of an image generation model to obtain a text embedding, and encoding the input image using a subject encoder of the image generation model to obtain a subject embedding. A guidance embedding is generated by combining the subject embedding and the text embedding, and then an output image is generated based on the guidance embedding using a diffusion model of the image generation model. The output image depicts aspects of the subject and the input description.

7 Claims, 12 Drawing Sheets

(56) References Cited

U.S. PATENT DOCUMENTS

2023/0237709 A1* 7/2023 Xu .................. G06V 10/774
　　　　　　　　　　　　　　　　　　　345/625
2023/0245418 A1* 8/2023 Zhang ................ G06F 16/954
　　　　　　　　　　　　　　　　　　　382/156

OTHER PUBLICATIONS

Ruiz, et al., "DreamBooth: Fine Tuning Text-to-Image Diffusion Models for Subject-Driven Generation", arXiv preprint arXiv:2208.12242v2 [cs.CV] Mar. 15, 2023, 25 pages.

Kumari, et al., "Multi-Concept Customization of Text-to-Image Diffusion", arXiv preprint arXiv:2212.04488v2 [cs.CV] Jun. 20, 2023, 26 pages.

Balaji, et al., "eDiff-I: Text-to-Image Diffusion Models with an Ensemble of Expert Denoisers" arXiv preprint arXiv:2211.01324v5 [cs.CV] Mar. 14, 2023, 24 pages.

Rombach, et al., "High-Resolution Image Synthesis with Latent Diffusion Models", arXiv preprint arXiv:2112.10752v2 [cs.CV] Apr. 13, 2022, 45 pages.

Vonynov, et al., "P+: Extended Textual Conditioning in Text-to-Image Generation", arXiv preprint arXiv:2303.09522v3 [cs.CV] Jul. 15, 2023, 16 pages.

Zhang, et al., "Adding Conditional Control to Text-to-Image Diffusion Models", arXiv preprint arXiv:2302.05543v1 [cs.CV] Feb. 10, 2023, 33 pages.

Li, et al., "GLIGEN: Open-Set Grounded Text-to-Image Generation", arXiv preprint arXiv:2301.07093v2 [cs.CV] Apr. 17, 2023, 21 pages.

Dong, et al., "DreamArtist: Towards Controllable One-Shot Text-to-Image Generation via Positive-Negative Prompt-Tuning", arXiv preprint arXiv:2211.11337v3 [cs.CV] Apr. 5, 2023, 10 pages.

Gal, et al., "Encoder-based Domain Tuning for Fast Personalization of Text-to-Image Models", arXiv preprint arXiv:2302.12228v3 [cs.CV] Mar. 5, 2023, 11 pages.

Han, et al., "SVDiff: Compact Parameter Space for Diffusion Fine-Tuning", arXiv preprint arXiv:2303.11305v4 [cs.CV] Jul. 2, 2023, 22 pages.

Chen, et al., "Subject-driven Text-to-Image Generation via Apprenticeship Learning", arXiv preprint arXiv:2304.00186v4 [cs.CV] Jun. 2, 2023, 17 pages.

Wei, et al., "ELITE: Encoding Visual Concepts into Textual Embeddings for Customized Text-to-Image Generation", arXiv preprint arXiv:2302.13848v1 [cs.CV] Feb. 27, 2023, 10 pages.

Ma, et al., "Unified Multi-Modal Latent Diffusion for Joint Subject and Text Conditional Image Generation", arXiv preprint arXiv:2303.09319v1 [cs.CV] Mar. 16, 2023, 14 pages.

\* cited by examiner

PERSONALIZED TEXT-TO-IMAGE GENERATION

CROSS-REFERENCE TO RELATED APPLICATION

This application claims priority to, and the benefit of, U.S. Provisional Application Ser. No. 63/497,353 filed on Apr. 4, 2023, entitled PERSONALIZED TEXT-TO-IMAGE GENERATION. The entire contents of the foregoing application are hereby incorporated by reference for all purposes.

BACKGROUND

The present disclosure relates to image generation using a machine learning model. Image generation is a field of machine learning that relates to generating novel image content. Models used for image generation may include auto-encoders, generate adversarial networks (GANs), and diffusion models. Diffusion models utilize a noise map and a denoising operation to generate images. The diffusion model can include a forward process that adds noise to the input data (e.g., digital image) through a serious. The forward process can be followed by a reverse process that reconstructs an image by denoising the data.

SUMMARY

Embodiments of the present disclosure provide a machine learning model including a generative network that can learn a concept from a set of images, then generate new scenes or styles of the concept from an input prompt. Personalized image synthesis may generate new images of a particular subject (e.g., person, animal, object, etc.) with different poses, backgrounds, locations, positions, orientations, dressing, lighting, styles, all while keeping the same subject's identity.

A method, apparatus, and non-transitory computer readable medium for generating an image are described. One or more aspects of the method, apparatus, and non-transitory computer readable medium include obtaining an input description and an input image depicting a subject. One or more aspects of the method, apparatus, and non-transitory computer readable medium further include encoding the input description using a text encoder of an image generation model to obtain a text embedding, and encoding the input image using a subject encoder of the image generation model to obtain a subject embedding. One or more aspects of the method, apparatus, and non-transitory computer readable medium further include generating a guidance embedding by combining the subject embedding and the text embedding, and generating an output image based on the guidance embedding using a diffusion model of the image generation model, wherein the output image depicts the subject and the input description.

A method, apparatus, and non-transitory computer readable medium for training an image generation model are described. One or more aspects of the method, apparatus, and non-transitory computer readable medium include obtaining a training data set including a training image. One or more aspects of the method, apparatus, and non-transitory computer readable medium further include training the image generation model including a subject encoder and a diffusion model based on the training set, wherein the subject encoder is trained to encode an input image depicting a subject to obtain a subject embedding, and wherein the diffusion model is trained to generate an output image depicting the subject based on the subject embedding.

A method, apparatus, and non-transitory computer readable medium for generating an image are described. One or more aspects of the method, apparatus, and non-transitory computer readable medium include one or more processors, and one or more memories including instructions executable by the one or more processors. One or more aspects of the method, apparatus, and non-transitory computer readable medium further include an image generation model comprising parameters stored in the one or more memories, wherein the image generation model is configured to receive a plurality of images as input, and is trained to generate a new image based on a feature embedding and a text embedding generated from the plurality of images and an input description.

DETAILED DESCRIPTION

Figure 1:
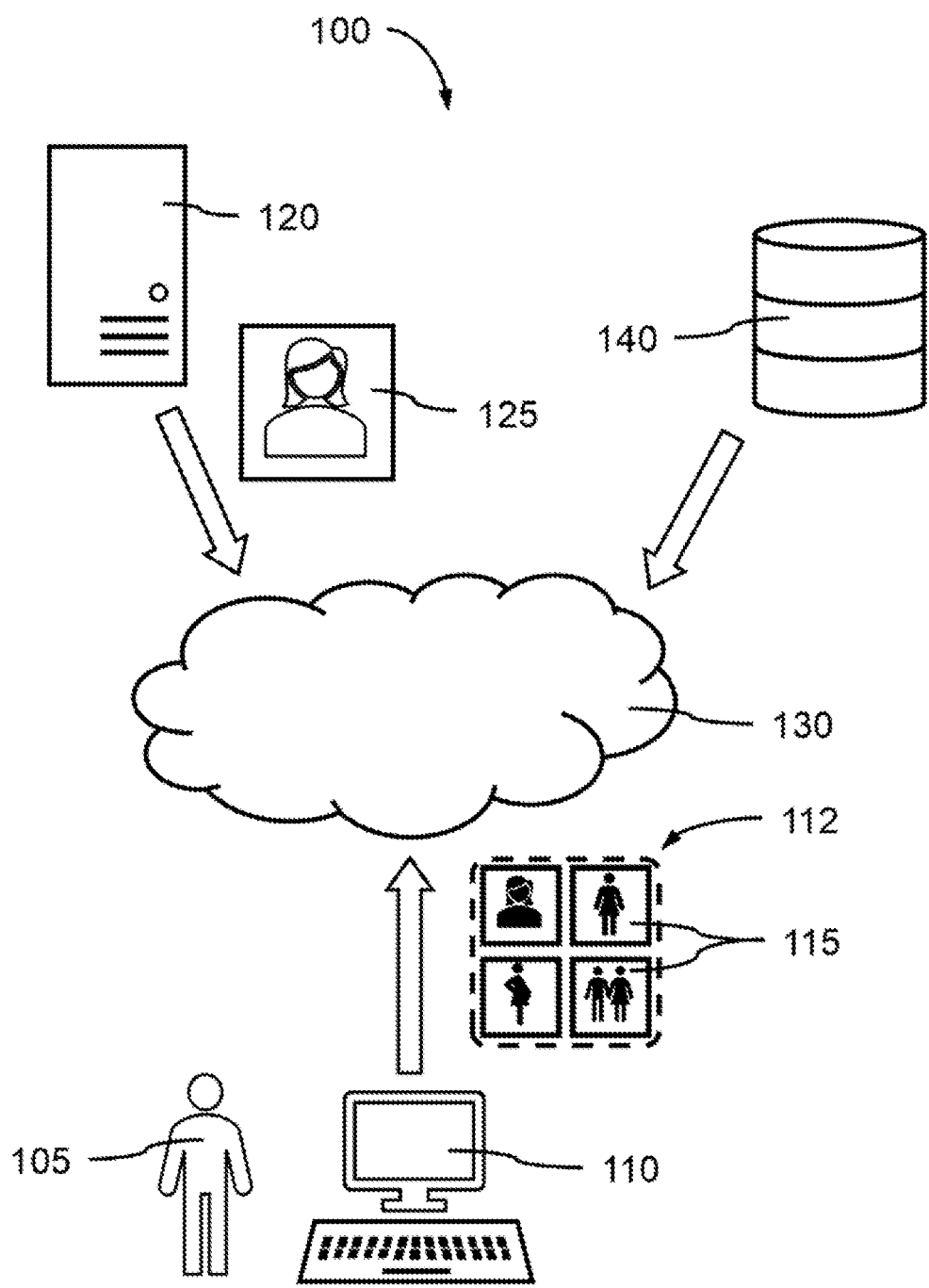
FIG. 1 is an illustrative depiction of a high-level diagram of users interacting with an image generator system, including a neural network for generating a new image of a subject in a novel arrangement, according to aspects of the present disclosure.

The present disclosure relates to generating customized digital images. In some case, an image is generated based on an initial set of images of an individual subject (e.g., person, animal, building, object, etc.) and a descriptive text prompt, that changes aspects of the individual subject in the image, while maintaining sufficient detail to still recognize the subject in the new image.

Image generations models can be fine-tuned to generate custom images in a particular style or displaying a particular concept. In some cases, a training task for custom image generation can be referred to as a recognition problem. A recognition problem can be seen as an instance-conditioned generation task with identity preservation and language control. Using a compact embedding to represent the concept can lead to a lack of fine-grained identity details in the generated images. Furthermore, fine-tuning an image generation model can be costly and time consuming.

Various embodiments of the disclosure enable efficient generation of customized images by learning a concept from a set of representative inputs. An image generation apparatus can utilize a text-to-image model (e.g., diffusion model, variational autoencoder, etc.) with trainable adapter layers to extract rich identity information from the input images and introduce them into the fixed backbone of the pre-trained model. Using an adapter layer to learn a concept from a limited set of images can enable efficient, real-time fine tuning of a personalized image generation model.

In various embodiments, by using an adapter having trainable adapter layers, the model can preserve the identity details of the input concept while keeping the generation ability and language controllability of the pre-trained model. Input images can be converted to a textual token for general subject learning, and adapter layers can be introduced to adopt rich image representation for generating fine-grained identity details.

In various embodiments, new high-quality images can be generated from text description, p, and a few images of a subject (i.e., concept), using a pre-trained text-to-image model. A unique identifier, V, can be added to the input to represent the particular subject, and a learnable image encoder can be used to map the input images to a subject embedding. A pre-trained diffusion model can utilize the subject embedding along with the embedding of the original text prompts to generate new images of the input subject. The adapter layers can be added to the pre-trained model to take rich patch features extracted from the input images for better identity preservation. A denoising loss can be used to learn the new components, while the original weights of the pre-trained model are frozen. Training can involve recovering the input image through denoising guided by conditions.

The subject embedding, however, may miss the fine details of the input subject, such as the shape of object parts, textural details, structure details, and so on. To better preserve the subject identity, rich features containing identity details can be introduced into the pre-trained diffusion model.

In various embodiments, a machine learning model that can generate text-aligned, identity-preserved, and high-fidelity image variations of an input concept is provided.

In various embodiments, the network architecture can be trained and used to generate a new image with the same identifiable subject as a set of input images, but with a different arrangement of object(s), location(s), position(s), attribute(s), material, expression, and style. Because the subject of the input concept in the images may not make up a large enough portion of the image, the subject may be cropped out from each input image to obtain a set of conditional images, which can force the machine learning model to focus on the exact object. The background of each cropped image may also be masked out, where the mask may be generated at the pixel level of the image. Images with multiple potential subjects/objects can be filter out to simplify the training.

In various embodiments, rich patch feature tokens can be extracted from the input images with a patch encoder, and the rich patch feature tokens injected into adapter layers of a U-Net for greater identity preservation. The U-Net of a pre-trained diffusion model can use the prompt embeddings and the rich patch feature tokens as conditions to generate new images of the input subject. Vision Transformers (ViT) can take advantage of transformers by treating an image as a sequence of patch tokens (e.g., 16×16 patches).

In various embodiments, $\hat{V}$, can be a unique identifier used to represent the input subject, and [class noun] is a coarse category of the subject. A text prompt can have a format of " . . . $\hat{V}$ [class noun] . . . " For example, if the original prompt is "A photo of a person playing guitar", then the modified prompt with the identifier is "A photo of a $\hat{V}$ person playing guitar", where "person" is the class noun.

Accordingly, embodiments of the disclosure improve on a personalized image generation process and system, where the machine learning model can achieve identity preservation even with one input image at inference time. The model can generate language-aligned, identity-preserved images on unseen concepts with only a single forward pass.

Network Architecture

One or more aspects of the apparatus and method include one or more processors; a memory coupled to and in communication with the one or more processors, wherein the memory includes instructions executable by the one or more processors to perform operations including:

In various embodiments, an encoder architecture can be used to encode the images and learn a concept from a set of images, then generate new scenes or styles of the concept from an input prompt. The original weights of the pre-trained model can be frozen (i.e., fixed) and the model can be extended with new trainable adapter layers. In various embodiments, an original transformer block contains a self-attention layer followed by a cross-attention layer that takes both the visual feature tokens and the textual embeddings as inputs for cross-attention learning. In each transformer block, a new learnable adapter layer can be added between the two frozen layers. The new layer can be formulated as:

$$y' := y + \beta \cdot \tanh(\gamma) \cdot S([y, f_p]).$$

FIG. 1 is an illustrative depiction of a high-level diagram of users interacting with an image generator system, including a neural network for generating a new image of a subject in a novel arrangement, according to aspects of the present disclosure.

In various embodiments, an image generation system 100 can involve a user 105 who can interact with image generating software on a user device 110. The user device 110 can communicate with an image generation apparatus 120, which can be a server located on the cloud 130. The image generation apparatus 120 can generate a new image 125 from an input set 112 of images 115, where each of the images 115 contain the same subject. The image generation apparatus 120 can obtain the set 112 of images 115 from the user device 110 or from a database 140, as instructed by the user 105.

Embodiments of the disclosure can be implemented in a server operating from the cloud 130, where the cloud 130 is a computer network configured to provide on-demand availability of computer system resources, such as data storage and computing power. In some examples, the cloud 130 provides resources without active management by the user 105. The term cloud is sometimes used to describe data centers available to many users over the Internet. Some large cloud networks have functions distributed over multiple locations from central servers. A server is designated an edge server if the server has a direct or close connection to a user. In some cases, a cloud 130 is limited to a single organization. In other examples, the cloud 130 is available to many organizations. In an example, a cloud 130 includes a multi-layer communications network comprising multiple edge routers and core routers. In another example, a cloud 130 is based on a local collection of switches in a single physical location.

In various embodiments, the functions of the image generation apparatus 120 can be located on or performed by the user device 110. User device 110 may be a personal computer, laptop computer, mainframe computer, palmtop computer, personal assistant, smart phone, tablet, mobile device, or any other suitable processing apparatus. In some non-limiting examples, user device 110 includes software that incorporates an image generation application. In some examples, the image generation application on user device 110 may include functions of image generation apparatus 120. Images 115 and other resources for obtaining the images 115 may be stored on the user device 110, a database 140, or a combination thereof.

In various embodiments, a user interface may enable user 105 to interact with user device 110. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

In various embodiments, an image generation apparatus 120 can include a computer implemented network comprising a user interface, and a machine learning model, which can include a diffusion model. The image generation apparatus 120 can also include a processor unit, a memory unit, a training component, a mask component, a noise component, and an image generation component. The training component can be used to train the machine learning model. Additionally, image generation apparatus 120 can communicate with database 140 via cloud 130. In some cases, the architecture of the image generation model is also referred to as a network model. The image generation component can be trained to generate a new image using the image generation model. Further detail regarding the architecture of image generation apparatus 120 is provided for example with reference to FIGS. 3-7, and 10. Further detail regarding the operation of image generating apparatus 120 is provided, for example, with reference to FIGS. 2-11.

In various embodiments, image generating apparatus 120 is implemented on a server. A server provides one or more functions to users linked by way of one or more communication networks. In some cases, the server can include a single microprocessor board, which includes a microprocessor responsible for controlling aspects of the server. In some cases, a server uses one or more microprocessors and protocols to exchange data with other devices/users on one or more of the communication networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 130 can be a computer network configured to provide on-demand availability of computer system resources, such as data storage and computing power. In some examples, cloud 130 provides resources without active management by user 105. The term "cloud" is sometimes used to describe data centers available to many users (e.g., user 105) over the Internet. Some large cloud networks have functions distributed over multiple locations from central servers. A server is designated an edge server if the server has a direct or close connection to a user (e.g., user 105). In some cases, cloud 130 is limited to a single organization. In other examples, cloud 130 is available to many organizations. In an example, cloud 130 includes a multi-layer communications network comprising multiple edge routers and core routers. In another example, cloud 130 is based on a local collection of switches in a single physical location.

Database 140 is an organized collection of data, where for example, database 140 can store data in a specified format known as a schema. Database 140 may be structured as a single database, a distributed database, multiple distributed databases, or an emergency backup database. In some cases, a database controller may manage data storage and processing in database 140. In some cases, a user 105 interacts with the database controller. In other cases, a database controller may operate automatically without user interaction.

Figure 2:
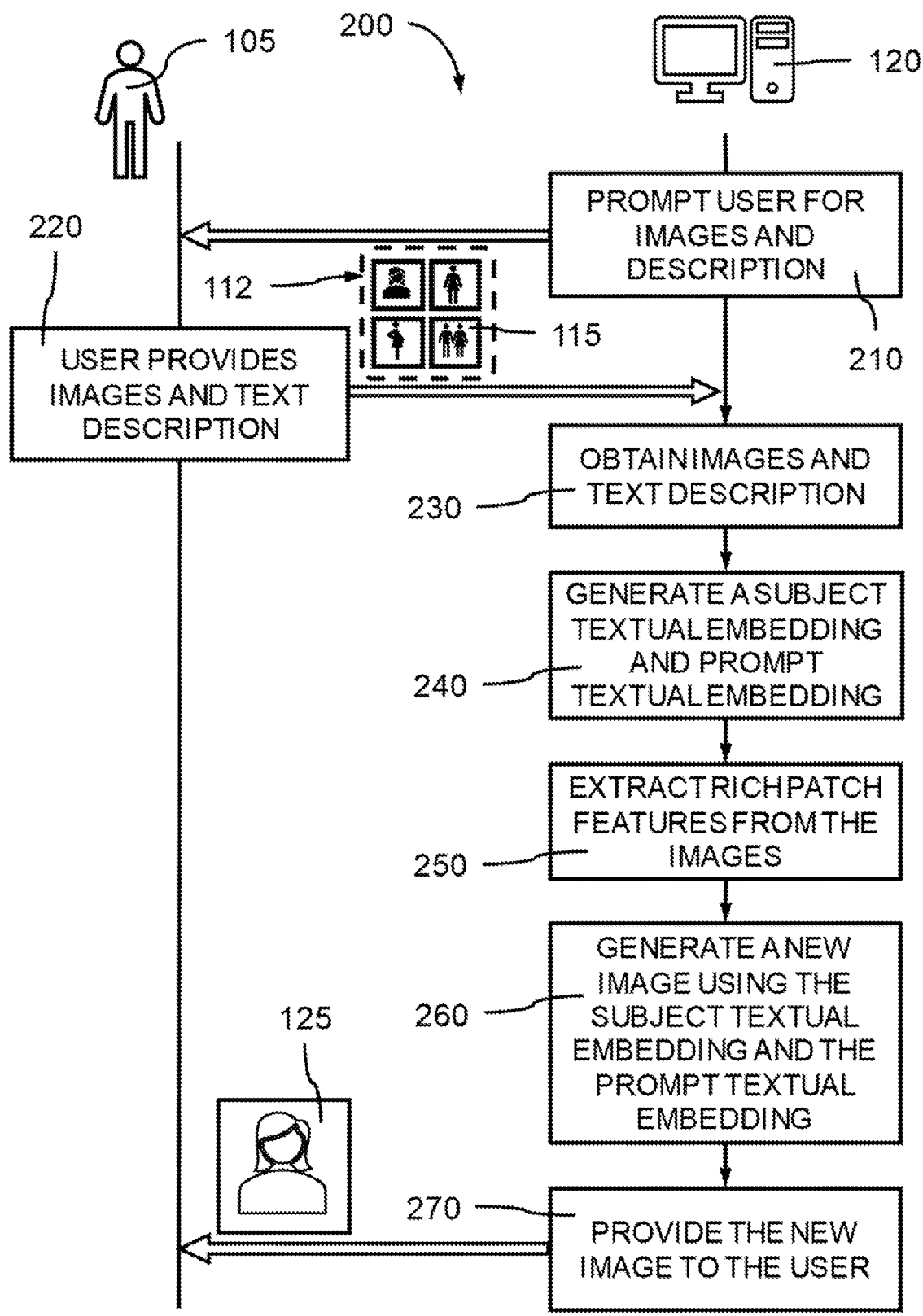
FIG. 2 shows a flow diagram for a method of generating a customized image using a machine learning model and a text description, according to aspects of the present disclosure.

FIG. 2 shows a flow diagram for a method of generating a customized image using a machine learning model and a text description, according to aspects of the present disclosure.

In various embodiments, given a few images of a subject, new high-quality images of this subject can be generated from a text description, p, where the generated image variations preserve the identity of the input subject. A representation of someone or something in images, that is a subject of the images, and a representation of a new portrayal of the subject in words can be received by the machine learning model, and a new, custom image showing the same subject in a novel arrangement not seen in the received images can be generated.

At operation 210, image generation apparatus 120 can prompt a user 105 to provide a plurality of initial images 115, where the set 112 of the plurality of images 115 contains the same subject, which can be a person, an object, a building, an animal, etc., where the subject is the primary visual element that is the focus of the image 115. The subject can be present on a background that presents a scene for the subject, where the subject and scene can present a concept. The image generation apparatus 120 can prompt a user to provide a textual description for a new image to be generated, where the requested textual description provides attributes and details about the subject and background different from the initial images obtained by the image generation apparatus 120.

At operation 220, the user 105 can provide a set 112 of images 115 to the image generation apparatus 120, where the images 115 may be provided from a user device 110 or identified on another device, for example, a database 140 in communication with the user device 110 and the image generation apparatus 120. The images can be a set 112 of images 115 that each includes the same person, object, building, animal, etc., where the image generation apparatus 120 can use the set 112 of images 115 and a learnable image encoder to map the initial images 115 to a subject embedding.

At operation 230, the image generation apparatus 120 can obtain the set 112 of images 115 and the text description, where the images 115 can be obtained from the user device 110 or database 140, and the text description can be obtained from the user 105. The text description prompts can have a format of " ... $\hat{V}$ [class noun] ... ", where $\hat{V}$ is a unique identifier to represent the input subject, and [class noun] is a coarse category of the subject. A modified prompt, $p_s$, can be obtained from the original; prompt, p, by putting the identifier right before the class noun of the subject.

In various embodiments, a natural language processing (NLP) model can receive and analyze a text description prompt provided by a user 105. The natural language processing (NLP) model can be trained and used to interpret the text description provided by the user 105.

At operation 240, the image generation apparatus 120 can map the initial images 115 to a subject embedding. In some cases, the initial images 115 can be converted into a subject embedding by mapping the images to a compact concept feature vector, $f_c$, in the textual latent space. For example, a subject image encoder, $E_c$, can convert the input images to a compact textual embedding, $f_c$. The subject embedding can represent identity attributes of a subject (i.e., attributes of the subject that are invariant when the subject is depicted in a different pose or scene, or that enable a subject to be recognized in different scenes or poses).

In various embodiments, a pre-trained diffusion model (DM) takes the subject embedding along with the embedding of the original prompts (i.e., text description) to generate new images of the input subject. Contrastive Language-Image Pre-Training (CLIP) is an example of a multimodal neural network trained on a variety of (image, text) pairs, where the network can be instructed in natural language to predict the most relevant text snippet, given an image, without directly optimizing for the task.

In various embodiments, the final textual embeddings of the input prompt can be obtained from the Text embeddings, $c_s$, of the modified prompt, e.g. $c_s$=CLIP($p_s$). The embedding of identifier, $\hat{V}$, can be a word vector that can be replaced with the concept feature vector, $f_c$, to obtain the subject injected textual embedding c. The learned subject embedding is a compact feature containing the global semantics of the input images.

At operation 250, rich patch features can be extracted from the images 115, where the rich patch features can be used to capture the foreground detail and maintain the subject identity. More input images can provide more details of the foreground to better preserve the subject identity, where to better preserve the subject identity, rich features containing identity details can be injected into a pre-trained diffusion model.

In various embodiments, rich patch feature tokens can be extracted from the input images 115 with a patch encoder.

At operation 260, a new image 125 can be generated based on the subject embedding, prompt embedding, and rich patch feature tokens, where the image can be generated by an image generation component, for example, a pre-trained diffusion model.

In various embodiments, the pre-trained diffusion model can include adapter layers that can use rich patch feature tokens extracted from the input images for identity preservation, where the rich patch feature tokens can be injected into the adapter layers of a U-Net to improve identity preservation. An adapter can receive an arbitrary number of conditioning images as inputs during inference. In various embodiments, during training, the image encoders and the adapter layers are trainable, while the other parts are frozen.

The U-Net of the pre-trained diffusion model takes the prompt embeddings and the rich patch feature tokens as conditions to generate the new images of the input subject.

In various embodiments, the original weights of the pre-trained model can be frozen (i.e., fixed), and the model can be extended with new trainable adapter layers, where the pre-trained model retains the visual synthesis and language understanding abilities, but can further learn the additional visual features, as the rich patch feature tokens containing identity details. A denoising loss can be used to learn the new components, while the original weights of the pre-trained model are frozen.

At operation 270, a new image 125 can be provided to the user 105, for example, by transmitting the new image over a communications network (e.g., Internet) to the user device 110.

Figure 3:
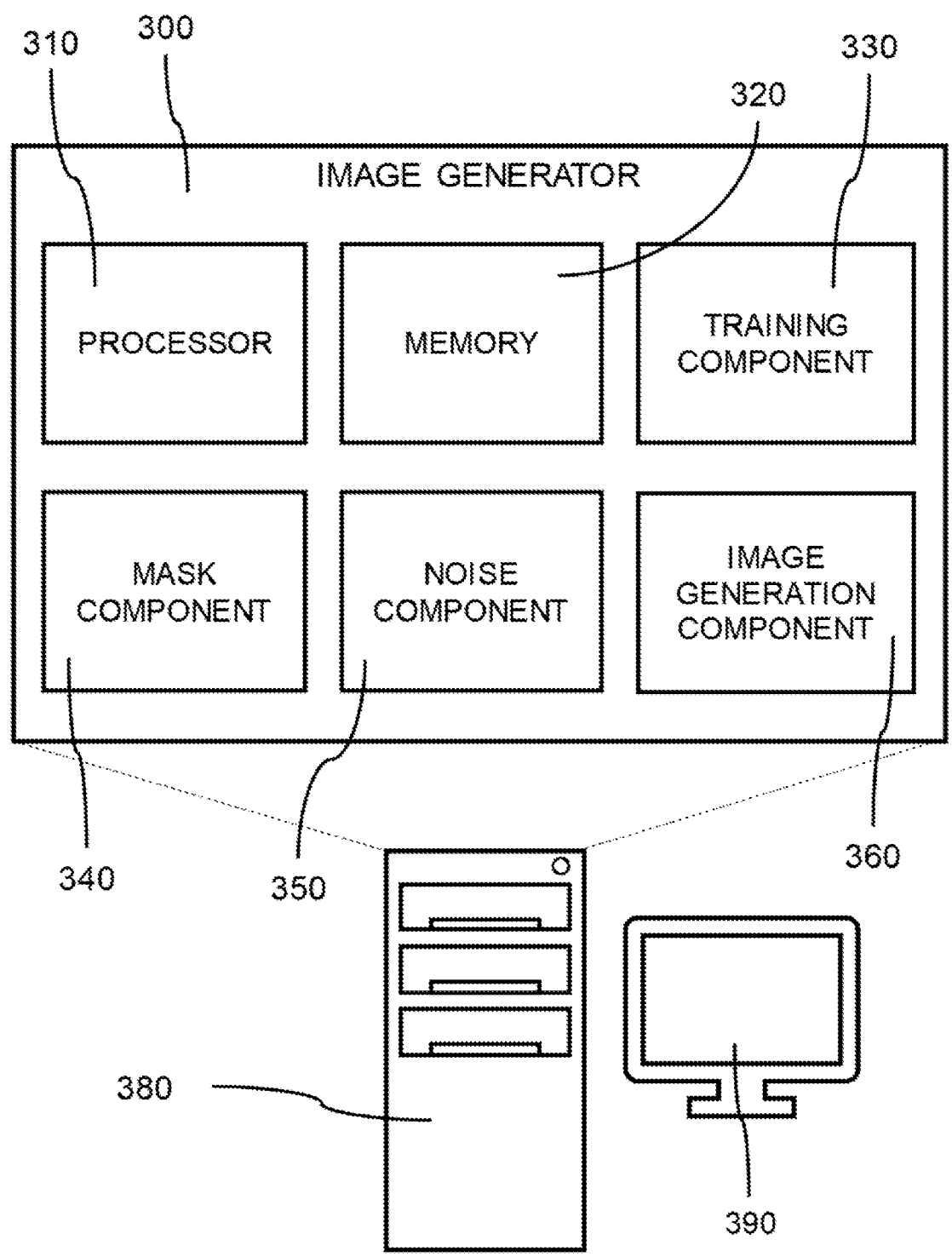
FIG. 3 shows a block diagram of an example of an image generator, according to aspects of the present disclosure.

FIG. 3 shows a block diagram of an example of an image generator, according to aspects of the present disclosure.

In one or more embodiments, an image generator 300 obtains original image(s) 115 including original content, and receives a text description (e.g., prompt) indicating different content to be depicted in a new image. The original image(s) 115 can be stored in computer memory 320.

In various embodiments, the image generator 300 can include a computer system 380 including one or more processors 310, computer memory 320, a training component 330, a mask component 340, a noise component 350, and an image generation model 360 (e.g., an image generation model). The computer system 380 of the image generator 300 can be operatively coupled to a display device 390 (e.g., computer screen) for presenting prompts and images to a user 105, and operatively coupled to input devices to receive description input from the user. The image generation model 360 can be an image generation model, that can include a text encoder, a subject encoder, a patch encoder, and a diffusion model, as further described in reference to FIG. 4.

In various embodiments, the diffusion model can include a U-Net having an adapter layer. The text encoder can be, for example, a transformer, that receives a text prompt as input and generates a text embedding as output. The subject encoder can be, for example, a pre-trained multimodal encoder as the backbone followed by a randomly initialized fully-connected layer, that receives the images as input and generates a subject embedding as output. The patch encoder can be, for example, a pre-trained CLIP image encoder as the backbone followed by a randomly initialized fully-connected layer, that receives the images as input and generates a feature (i.e., patch) embedding as output. The diffusion model can be a stable diffusion model with a U-Net that can receive the text embedding, subject embedding, and feature embedding, and generates a new image.

In various embodiments, training component 330 can receive a training data set for the image generation model 360, and apply a loss function to results obtained from the model being trained using the training data set. The training component 330 can update the model weights of the image generation model 360 based on the results of the loss function.

A description can include text indicating a desired edit to the original image(s) 115, where the output image 125 is generated based on the description that describes the desired features of a subject and/or scene. In some aspects, a prompt from the image generator 300 includes an original image 115 presented to the user 105 on the display device 390 or communicated to a user's device 110.

In various embodiments, mask component 340 identifies a mask indicating a region of the original image(s) to be removed. The mask component 340 can identify a region of the image to be ignored, so as to focus on the subject of the image.

In various embodiments, noise component 350 generates a noise map based on the original image 115 and a mask, where the output image 125 is generated based on the noise map. In some examples, noise component 350 generates an iterative noise map for each of a set of output images with successively reduced noise to produce the output image.

According to some aspects, image generation model 360 (e.g., diffusion model) generates an output image 125 including the original, identified subject from the original image(s) 115 and the modified content, where the new image 125 can be generated using a diffusion model that takes a vector generated from a description by a text encoder 430 (e.g., a transformer) as input. In some aspects, the output image 125 combines additional content in a manner consistent with the original content, such that the original subject is identifiable in the new image 125. In some examples, a diffusion model iteratively produces a set of output images.

Diffusion models are a class of generative models that convert Gaussian noise into images from a learned data distribution using an iterative denoising process. Diffusion models are also latent variable models with latent vectors, $z=\{z_t|t\in[0, 1]\}$, that obey a forward process $q(z|x)$ starting at data $x\sim p(x)$. This forward process is a Gaussian process that satisfies the Markovian structure. For image generation, the diffusion model is trained to reverse the forward noising process (i.e., denoising, $z_t\sim q(z_t|x)$). In addition, a text embedding from the natural language processor (NLP) can be used as a conditioning signal that guides the denoising process. A text encoder can encode the input text of the description into text embeddings, where the diffusion model maps the text embedding into an image.

In various embodiments, the computation and parameters in a diffusion model take part in the learned mapping function which reduces noise at each timestep (denoted as F). The model takes as input x (i.e., noisy or partially denoised image depending on the timestep), the timestep t, and conditioning information the model was trained to use. In some cases, the conditioning information can be a text prompt (e.g., TP, " ", and AP are text prompts). Classifier-free guidance is a mechanism to vary and control the influence of the conditioning on the sampled distribution at inference. In some cases, the conditioning can be replaced by the null token (i.e., the empty string, " ", in case of text conditioning) during training. A single scalar can control effect of the conditioning during inference.

Some examples of the method, apparatus, non-transitory computer readable medium, and system further include iteratively producing a plurality of output images. Some examples further include generating an iterative noise map for each of the plurality of output images with successively reduced noise to produce the output image.

Embodiments of the disclosure utilize an artificial neural network (ANN), which is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the nodes process the signal and then transmits the processed signal to other connected nodes. In some cases, the signals between nodes comprise real numbers, and the output of each node is computed by a function of the sum of the node's inputs. In some examples, nodes may determine their output using other mathematical algorithms (e.g., selecting the max from the inputs as the output) or other suitable algorithms for activating the node. Each node and edge is associated with one or more node weights that determine how the signal is processed and transmitted.

During the training process, these model weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the layer's inputs. The initial layer is known as the input layer and the last layer is known as the output layer. In some cases, signals traverse certain layers multiple times.

In various embodiments, a stable diffusion model can be used as the base generative model, and masked image synthesis method with stochastic differential equations may be used as a baseline. Note that the same hyperparameters (i.e., noise strength, total diffusion steps, sampling schedule, classifier free guidance strength C) can be used.

Figure 4:
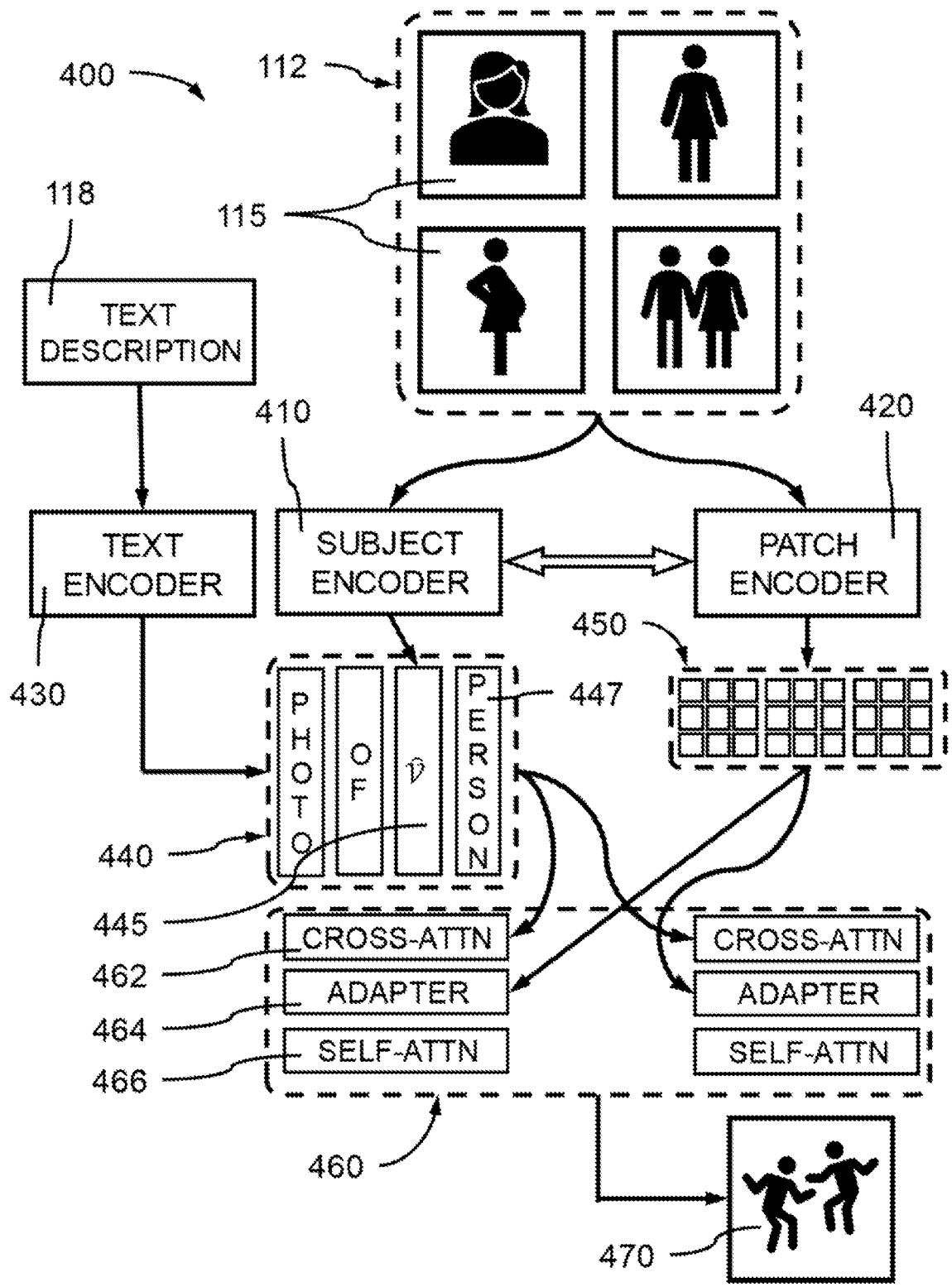
FIG. 4 shows a diagram of a personalized text-to-image generator, according to aspects of the present disclosure.

FIG. 4 shows a diagram of a personalized text-to-image generator, according to aspects of the present disclosure.

In various embodiments, an image generation model 360 in FIG. 3 can be, for example, image generation model 400 without test-time fine-tuning, where the model can be built upon a pre-trained text-to-image model. This involves, given a set 112 of images 115 of the same subject, for example, a person (e.g., man, woman, child), an animal (e.g., cat, dog, horse, etc.), an object, (e.g., car, plane, toaster, building, etc.) in a scene, as well as a language (i.e., text) prompt that describes how a new image of the input subject and scene should be constructed, the model can output a generated image with the same subject, while providing what the text prompt describes. The problem is difficult to solve because not only should the identity of the input subject be maintained, but the generated image should also follow the description in the text prompt. It is difficult to balance both subject identity and image description fidelity in the image generation model without test-time fine-tuning. For example, given input of several digital images (e.g., photos) of the same woman and a language (i.e., text) prompt, "a woman is eating at the Eiffel Tower," the output image should be of the same woman eating at the Eiffel Tower.

In various embodiments, subject encoder 410 and a patch encoder 420 can receive a set 112 of images 115, wherein each of the images 115 in the set 112 includes a same subject (e.g., person, animal, object, etc.). The subject encoder 410 can learn the general concept of the input images 115 by converting the images 115 to a textual token. The subject encoder 410 can map the subject of the images 115 to the compact textual embedding. The patch encoder 420 can generate rich patch feature tokens 450 from the input images 115, where the rich patch feature tokens 450 transform features of the image 115 to embeddings, $f_p$.

In various embodiments, images with multiple potential subjects/objects 116 can be filter out to simplify the training.

In various embodiments, subject encoder 410 and a patch encoder 420 can share the same backbone 415 and have the last layers fully connected layers, but have different linear layers between the backbone and fully connected layers. The subject encoder 410 and the patch encoder 420 can each be a multi-modal encoder such as a CLIP image encoder. In some cases, the encoders have a shared backbone.

In various embodiments, the subject image encoder 410, $E_c$ can be used to map the images to a compact subject feature vector, $f_c$, in the textual space, where $f_c$ is the average feature vector of the global features of all input images, given by:

$$f_c = \sum_{i=1}^{N} \frac{E_c(x_s^i)}{N}.$$

The averaging of a plurality of images with different backgrounds can provide filtering of the background portions of the images, while maintaining the subject identity. The use of more images at input with the same subject can improve removal of inconsistent features between images.

In various embodiments, a text encoder 430 (e.g., a CLIP text encoder) can receive a text description 118, as a prompt, and map the words to form a prompt (i.e., text) embedding 440. A modified prompt, $p_s$, can be obtained from the original prompt, p, by putting the identifier, $\hat{V}$, 445 right before the class noun 447 of the subject. For example, if the original prompt, p, is "A photo of a person playing guitar", then the modified prompt, $p_s$, with the identifier, $\hat{V}$, is "A photo of a $\hat{V}$ person playing guitar", where "person" is the class noun. And for example, for "person" subject category, the identifier, $\hat{V}$, for the nouns that are coarse descriptions of "person", including "man", "woman", "baby", "girl", "boy", "lady", etc. can be inserted. A frozen (i.e., fixed parameter) text encoder 430, for example, a CLIP text encoder, can be used to map the other words, "A photo of," to form the prompt embedding 440. Other examples of a prompt can be, "a painting of $\hat{V}$ [class noun] in Van Gogh style", and "a photo of $\hat{V}$ [class noun] in mountain with aurora."

In various embodiments, the input images can be mapped to a textual space, as a compact textual embedding, so that the models have a deep understanding of the concept (i.e., subject), but can lead to a lack of fine-grained identity details in the generated images. A few trainable adapter layers can be added to extract rich identity information from the input images and inject them into the fixed backbone of the pre-trained model. This can preserve the identity details of the input concept while keeping the generation ability and language controllability of the pre-trained model.

In various embodiments, the embedding of identifier, $\hat{V}$, 445 can be replaced with the concept feature vector, $f_c$, generated by the subject encoder 410, to obtain the subject injected textual embedding c. This embedding can be the condition in the cross-attention layers 462 of a U-Net 460 in a text-to-image diffusion model. The rich patch feature tokens 450, generated by the patch encoder 420, can be introduced into the adapter layers 464 of a U-Net 460 for better identity preservation. In various embodiments, the U-Net 460 of the pre-trained diffusion model takes the prompt embeddings 440 with the concept feature vector, $f_c$, and the rich patch feature tokens, $f_p$, 450 as inputs to generate new images 470 of the subject in the images 115. The data flow in FIG. 4 for the U-Net 460 is bottom-up from the self-attention layer 466 to the adapter layer 464 to the cross-attention layer 462.

During training, the subject image encoder 410, the patch encoder 420, and the adapter layers 464 are trainable, while the weights of the cross-attention layers 462 and self-attention layers 466 are fixed (i.e., frozen).

CLIP is a multi-modal vision and language model, that can be used for image-text similarity and for zero-shot image classification. CLIP uses a ViT like transformer to get visual features and a causal language model to get the text features. Both the text and visual features are then projected to a latent space with identical dimensions. The dot product between the projected image and text features can be used as a similarity score.

In a non-limiting exemplary embodiment, the image generation model 400 can utilize Stable Diffusion or a text-to-image transformer model, as the pretrained text-to-image model, where the model can be trained on text-image pairs. For both the concept encoder, $E_c$, and the patch encoder, $E_p$, the encoder can be used as the backbone followed by a randomly initialized fully-connected layer.

Figure 5:
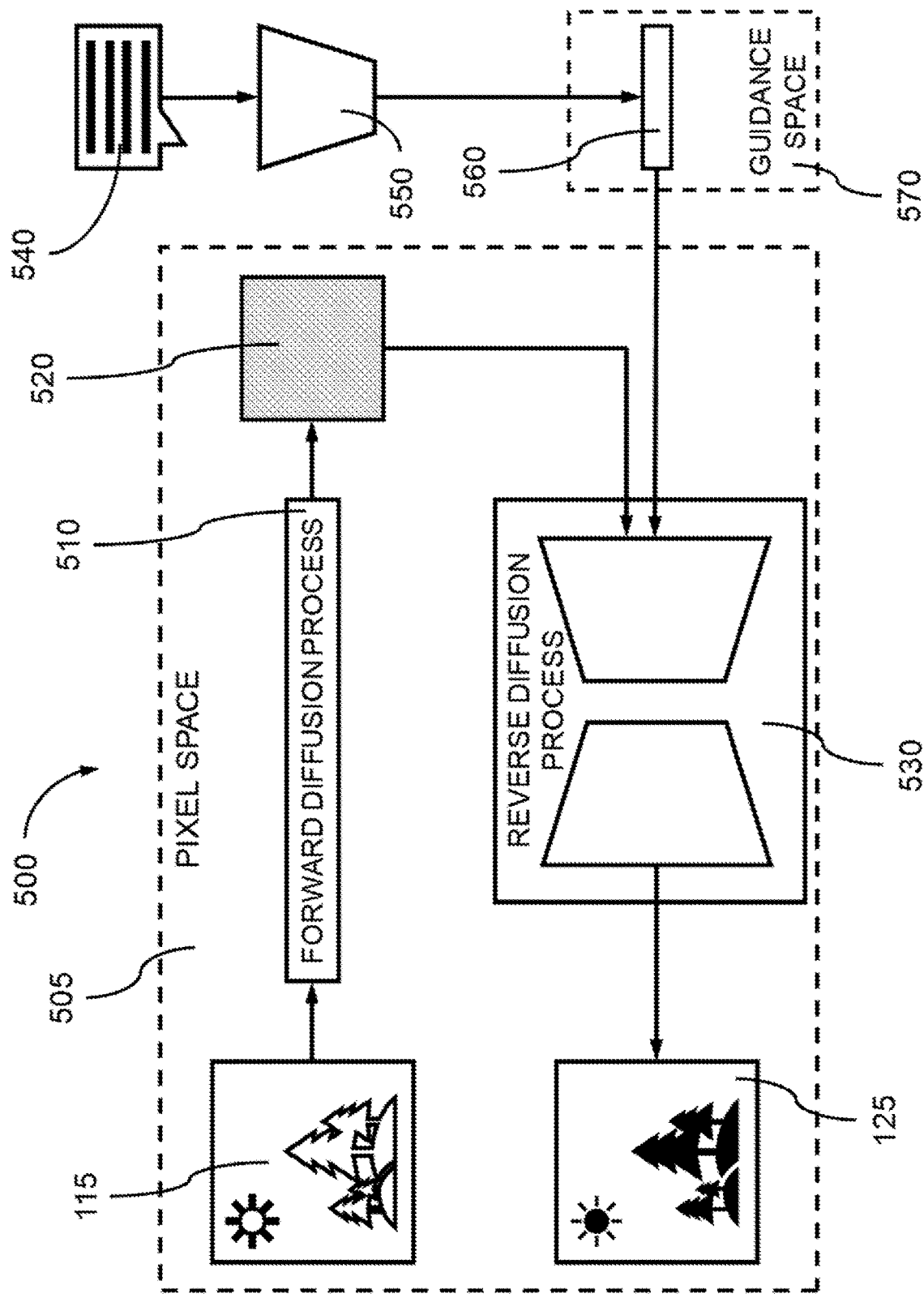
FIG. 5 shows a block diagram of an example of a guided diffusion model, according to aspects of the present disclosure.

FIG. 5 shows a block diagram of an example of a guided diffusion model, according to aspects of the present disclosure.

The guided latent diffusion model 500 depicted in FIG. 5 is an example of, or includes aspects of, the corresponding diffusion model of the image generation model 360 described with reference to FIG. 3.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 500 may take an original image 115 in a pixel space 505 as input and apply a forward diffusion process 510 to gradually add noise to the original image 115 to obtain noisy images 520 at various noise levels.

Next, a reverse diffusion process 530 (e.g., a U-Net ANN) gradually removes the noise from the noisy images 520 at the various noise levels to obtain an output image 125. In some cases, an output image 125 is created from each of the various noise levels. The output image can be compared to the original image to train the reverse diffusion process 530.

The reverse diffusion process 530 can also be guided based on a text prompt 540, or another guidance prompt, such as a text description, an image, a layout, a segmentation map, etc. The text prompt 540 can be encoded using a text encoder 550 (e.g., a multimodal encoder) to obtain guidance features 560 in guidance space 570. The guidance features 560 can be combined with the noisy images 520 at one or more layers of the reverse diffusion process 530 to ensure that the output image 125 includes content described by the text prompt 540. For example, guidance features 560 can be combined with the noisy features using a cross-attention block within the reverse diffusion process 530.

Figure 6:
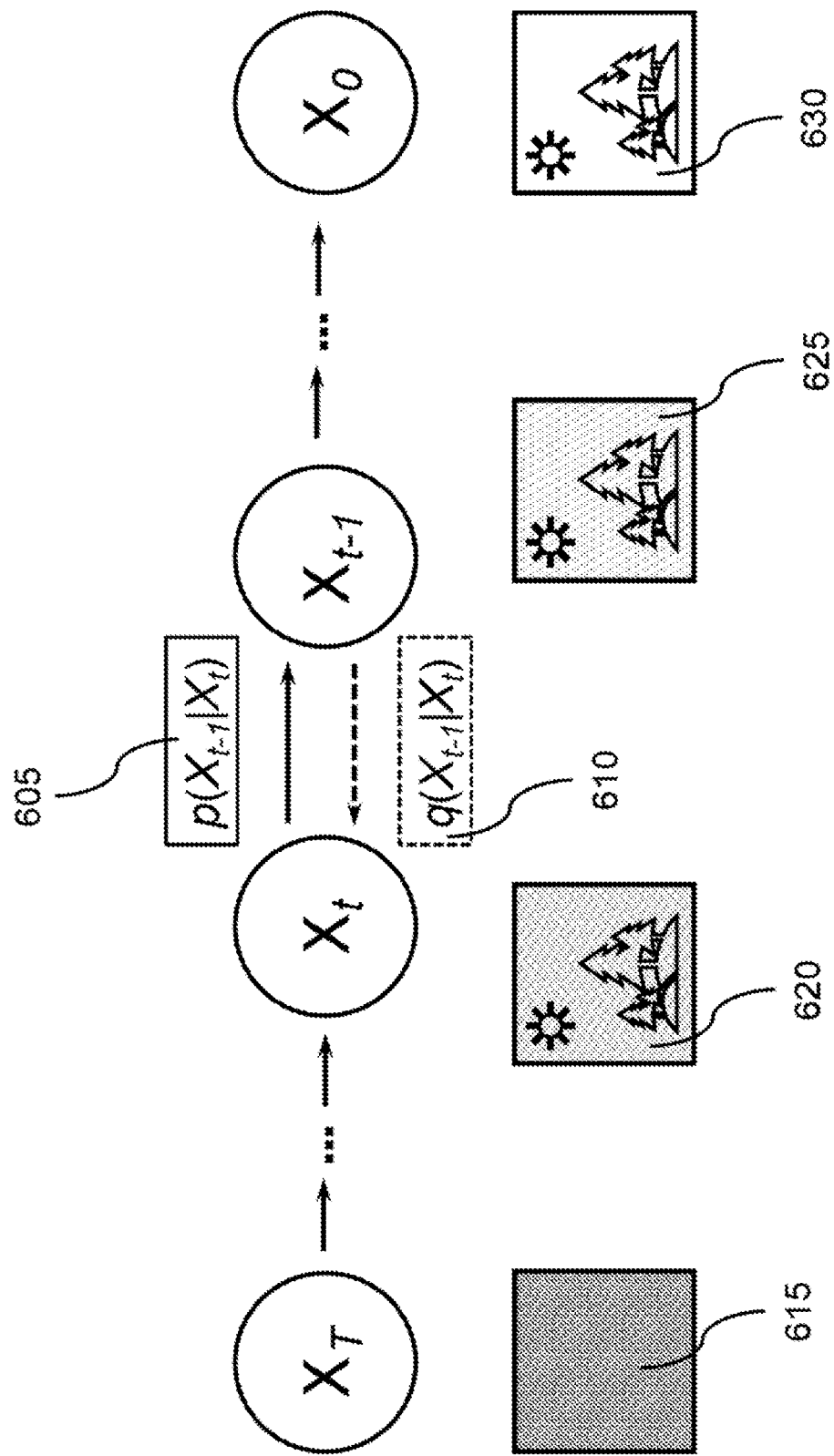
FIG. 6 shows a diffusion process according to aspects of the present disclosure.

FIG. 6 shows a diffusion process according to aspects of the present disclosure.

According to embodiments of the present disclosure, the example includes forward diffusion process 605 and reverse diffusion process 610. The example further includes noisy image 615, first intermediate image 620, second intermediate image 625, and original image 630. Original image 630 is an example of, or includes aspect of, the same element described with reference to FIGS. 1-2 and 4.

A diffusion model can include both a forward diffusion process 605 for adding noise to an image (or features in a latent space) and a reverse diffusion process 610 for denoising the images (or features) to obtain a denoised image. The forward diffusion process 605 can be represented as $p(x_{t-1}|x_t)$, and the reverse diffusion process 610 can be represented as $q(x_t|x_{t-1})$. In some cases, the forward diffusion process 605 is used during training to generate images with successively greater noise, and a neural network is trained to perform the reverse diffusion process 610 (i.e., to successively remove the noise).

In an example forward process for a latent diffusion model, the model maps an observed variable $x_0$ (either in a pixel space or a latent space) to intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network (e.g., U-Net) may be trained to perform the reverse process. During the reverse diffusion process 610, the model begins with noisy data $x_T$, such as a noisy image 615 and denoises the data to obtain the $p(x_{t-1}|x_t)$. At each step t-1, the reverse diffusion process 610 takes $x_t$, such as first intermediate image 620, and t as input. Here, t represents a step in the sequence of transitions associated with different noise levels. The reverse diffusion process 610 outputs $x_{t-1}$, such as second intermediate image 625 iteratively until $x_T$ is reverted back to $x_0$, the original image 630. The reverse process can be represented as:

$$p_\theta(x_{t-1}|x_t) := \mathcal{N}\left(x_{t-1}; \mu_\theta(x_t, t), \sum\nolimits_\theta (x_t, t)\right). \quad (1)$$

The joint probability of a sequence of samples in the Markov chain can be written as a product of conditionals and the marginal probability:

$$x_T : p_\theta(x_{0:T}) := p(x_T) \prod\nolimits_{t=1}^{T} p_\theta(x_{t-1}|x_t), \quad (2)$$

where $p(x_T) = \mathcal{N}(x_T; 0, I)$ is the pure noise distribution as the reverse process takes the outcome of the forward process, a sample of pure noise, as input and $\prod_{t=1}^{T} p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 7:
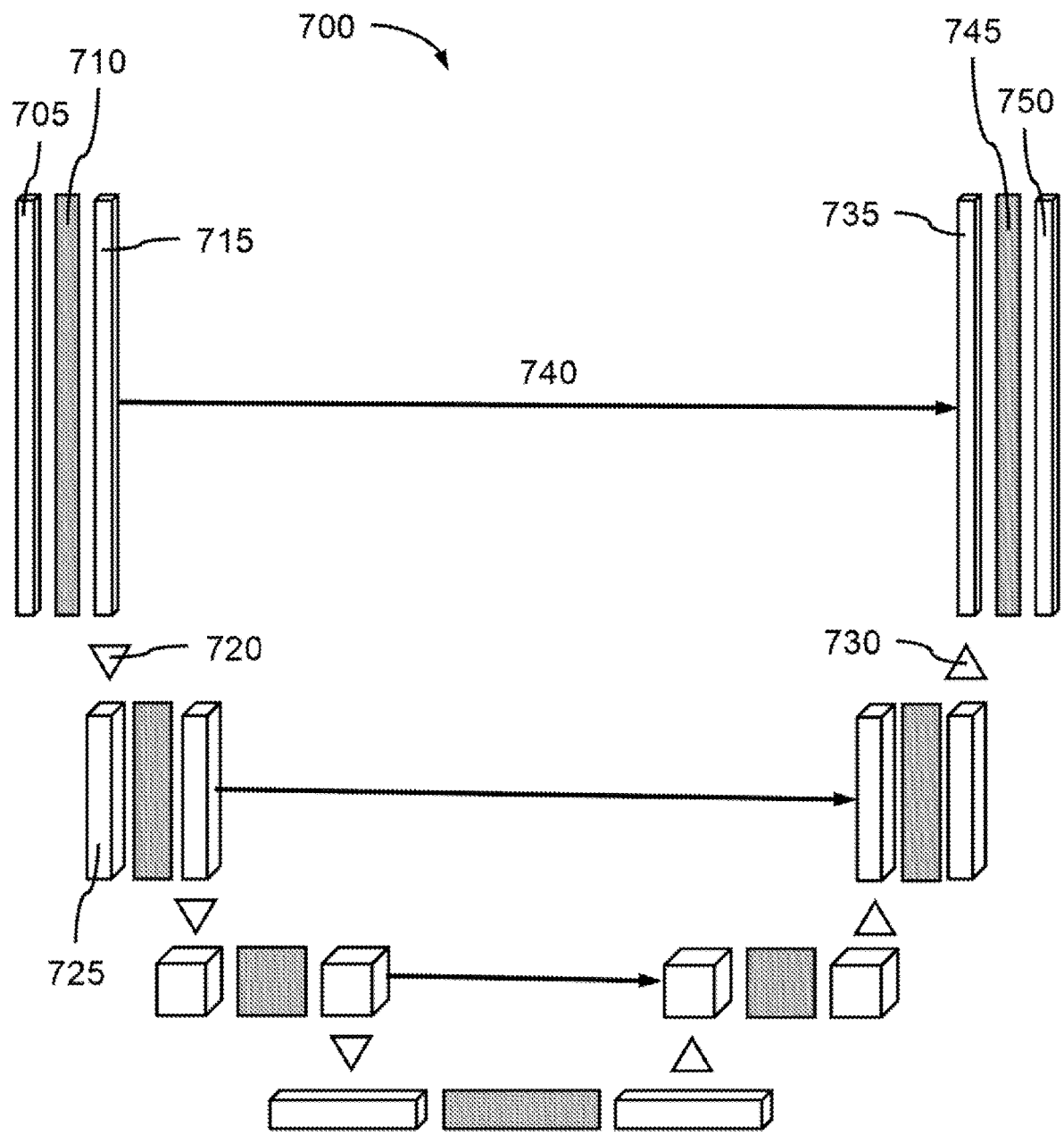
FIG. 7 shows an example of a U-Net, according to aspects of the present disclosure.

FIG. 7 shows an example of a U-Net, according to aspects of the present disclosure.

The U-Net 700 depicted in FIG. 7 is an example of, or includes aspects of, the architecture used within the reverse diffusion process described herein.

In some examples, diffusion models are based on a neural network architecture known as a U-Net. The U-Net 700 takes input features 705 having an initial resolution and an initial number of channels, and processes the input features 705 using an initial neural network layer 710 (e.g., a convolutional network layer) to produce intermediate features 715. The intermediate features 715 are then down-sampled using a down-sampling layer 720 such that down-sampled features 725 have a resolution less than the initial resolution and a number of channels greater than the initial number of channels.

This process is repeated multiple times, and then the process is reversed. That is, the down-sampled features 725 are up-sampled using up-sampling process 730 to obtain up-sampled features 735. The up-sampled features 735 can be combined with intermediate features 715 having a same resolution and number of channels via a skip connection 740. These inputs are processed using a final neural network layer 745 to produce output features 750. In some cases, the output features 750 have the same resolution as the initial resolution and the same number of channels as the initial number of channels.

In some cases, U-Net 700 takes additional input features to produce conditionally generated output. For example, the additional input features could include a vector representation of an input prompt (e.g., text description). The additional input features can be combined with the intermediate features 715 within the neural network at one or more layers. For example, a cross-attention module can be used to combine the additional input features and the intermediate features 715.

Embodiments of the disclosure can utilize an artificial neural network (ANN), which is a hardware and/or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of the node's inputs. In some examples, nodes may determine their output using other mathematical algorithms (e.g., selecting the max from the inputs as the output) or other suitable algorithms for activating the node. Each node and edge is associated with one or more node weights that determine how the signal is processed and transmitted.

In various embodiments, an NLP can be a transformer type natural language processor/neural language model (e.g., GPT), an encoder based natural language processor (e.g., Bidirectional Encoder Representations from Transformers (BERT), Robustly Optimized BERT (RoBERTa)), or other encoder/decoder based NLP.

A transformer or transformer network is a type of neural network model used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important.

The attention mechanism involves query, keys, and values denoted by Q, K, and V, respectively. Q is a matrix that contains the query (vector representation of one word in the sequence), K represents all the keys (vector representations of all the words in the sequence), and V is the values, which is the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights, a.

Inference

During the model's inference, the background of the cropped images can be masked out, but augmentations to the masked images may not be performed, i.e., $\mathcal{A}$ =None. Although the rich patch feature, $f_p$, is composed of tokens from only one image during training, the adapter layers 464 can actually take an arbitrary number of conditioning images as inputs during inference. For example, a user could provide a single image 115 for input or a dozen images 115 for input. This flexibility can be attributed to the concatenation operation in the adapter layer and the nature of self-attention.

Figure 8:
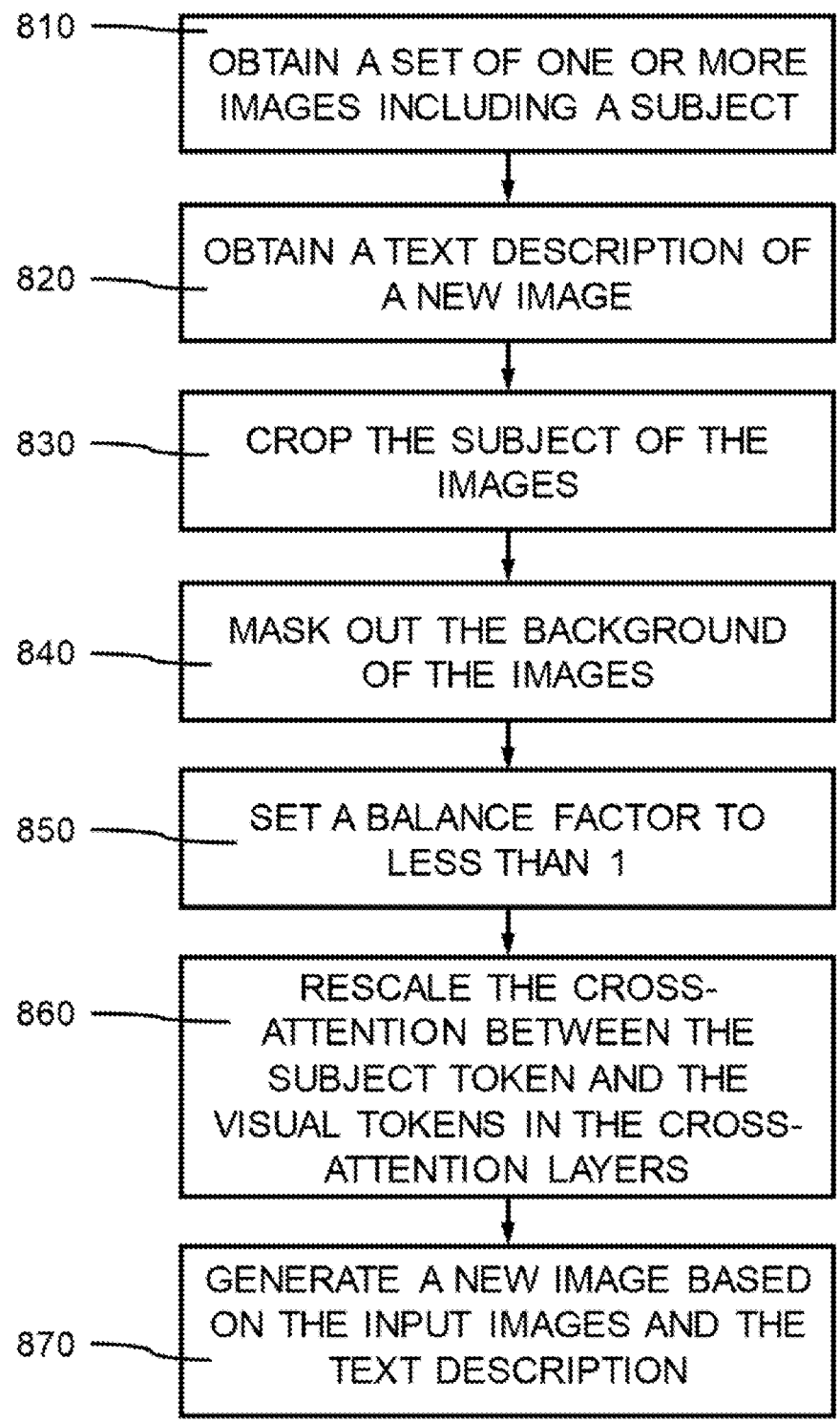
FIG. 8 shows a diagram of an example of a method of generating an image, according to aspects of the present disclosure.

FIG. 8 shows a diagram of an example of a method of generating an image, according to aspects of the present disclosure.

At operation 810, a set of one or more images of a subject are obtained, and provided to the image generation apparatus 120, where the images 115 contain the same subject. An adapter can take an arbitrary number of conditioning images as inputs during inference due to the concatenation operation in the adapter layer and the nature of self-attention.

At operation 820, a text description for a new image to be generated is obtained, and provided to the image generation apparatus 120, where the text description provides attributes and details to be applied to the new image. The input description provides a new depiction of the subject present in the plurality of input images.

At operation 830, the subject can be cropped from the images to enforce focus. The one or more images can be cropped to isolate the subject in each image. The training images contain the subject categories and the text description can contain the related coarse category nouns.

At operation 840, the backgrounds of the cropped images are masked out, where:

$$x_s^i := x_s^i \cdot m_s^i;$$

where $m_s^i$ is the mask for the subject in the i-th cropped image with 1 indicating the pixel of object and 0 indicating a background pixel. The entity segmentation masks can be collected for all the collected images using an entity segmentation model. The masked image set $X_s$ can be the final image condition for training the model.

In various embodiments, augmentations may not be performed to the masked images, or random augmentations can be performed to the masked image for training, where augmentation can randomly remove portions of the training images. This can act as a pseudo-pair generation of multiple images having different portions dropped out from a single training image At operation 850, the value of balance factor, $\beta$, is reduced below 1 during inference, so that the adapter layer takes both the visual information from the original pre-trained model and the conditioning images. A balance factor, $\beta$, can play the primary role for achieving a good balance between language understanding and identity preservation. Setting $\beta$ to 1 for training can result in a strong reconstruction of the input images with good identity preservation, while the language-image alignment is weakened. In various embodiments, the balance factor, $\beta$, can be about 0.1 to about 0.9, or about 0.2 to about 0.5, or about 0.3 during inference, although other ranges and values are also contemplated.

At operation 860, the subject token is renormalized with a factor of $\alpha \in (0, 1]$, which is equivalent to rescaling the cross-attention between the concept token and the visual tokens in the Cross-Attention layers. Renormalization can help to achieve a better balance between text-image alignment and identity preservation. With renormalization, the attentions of the nouns are more balanced, and the model successfully generates the style and the background of the prompt description.

To address this issue, the concept token can be renormalized with a factor of $\alpha \in (0, 1]$, where:

$$f_c = \alpha \cdot f_c.$$

The testing results indicate that larger $\beta$ or $\alpha$ can both contribute to better identity preservation but weaker language comprehension ability, where values of $\beta$=0.3, $\alpha$=0.4 can be used as a trade-off. Since there are only linear mappings from the prompt embeddings before calculating the cross-attention, such renormalization strategy is essentially equivalent to rescaling the cross-attention between the concept token and the visual tokens in the Cross-Attention layers 462, such that the attention of the concept token does not dominate the cross-attention. With renormalization, the attentions of the nouns are more balanced, and the model successfully applied the text description without loss of the subject identity.

At operation 870, a new image can be generated by an image generation component based on the input images and the text description, where the balance factor, $\beta$, and the renormalization factor, a, can achieve balance between text-image alignment and identity preservation.

Although the rich patch feature, $f_p$, is composed of tokens from only one image during training, the adapter can take an arbitrary number of conditioning images as inputs during inference. This flexibility is owning to the concatenation operation in the adapter layer and the nature of self-attention.

$X_t = \{x_t^i\}_1^N$ represents the set of the original images, where N is the number of input images. Because the portion of the input image showing the subject may not be large enough in comparison to the image size and/or background, the subject can be cropped out from each image to obtain a set of conditional images, $X_s = \{x_s^i\}_1^N$. Images that have the subject occupying less than 10% of the image area or greater than 70% of the image area may be filtered out (e.g., removed) from the set entirely. To further force the model to focus on the particular subject, the background of each cropped image can also be masked out, where:

$$x_s^i := x_s^i \cdot m_s^i;$$

where $m_s^i$ is the mask for the subject in the i-th cropped image with 1 indicating the pixel of object and 0 indicating a background pixel.

In various embodiments, during training, random augmentations can be performed to the masked image, where $x_s^i := \mathcal{A}(x_s^i)$;

where $\mathcal{A}$ is the augmentation operator. The masked image set $X_s$ can be the final image condition for training the model.

$$f_c = \sum_{i=1}^{N} \frac{E_c(x_s^i)}{N}.$$

The new layer is formulated as:

$$y' := y + \beta \cdot \tanh(\gamma) \cdot S([y, f_p]),$$

where S is the self-attention operator, y, is the visual feature tokens, $\gamma$ is a learnable scalar initialized as zero, the balance factor, $\beta$, is a constant to balance the weight and importance of the adapter layer, $f_p$ represents the rich patch token sequences extracted using an image encoder, $E_p$, from input images $X_s$. The self-attention operator, y, is the output from the of the self-attention layers 466 that is fed into the adjoining adapter layer 464. The learnable scalar, $\gamma$, is the learnable portion of the adapter layers 464, and represents an activation map. The output, y', is the output of the adapter layer 464, where the adapter layers 464 are trainable self-attention layers.

In a non-limiting exemplary embodiment, for each image 115, 257 visual tokens are extracted with the patch encoder, $E_p$, and the rich patch feature vector, $f_p$, is obtained as a token sequence by concatenating the tokens from all the input images, where:

$$f_p = Concat(\{E_p(x_s^i)\}_1^N);$$

where $x_s^i$ are the conditional images from 1 to N.

Compared to the compact subject embedding, the patch feature contains subject-related content details of the input images; and thus can improve identity preservation. Rich patch features, as represented by a token sequence, can be extracted from images for the identity preservation.

In various embodiments, only the adapter layers and the fully-connected layer of the image encoders are updated. The subject of the input training images can be learned by the subject image encoder 410 in FIG. 4, and mapped to a compact textual embedding. The original weights of the pre-trained text-to-image model are frozen in the full training procedure. The subject encoder 410 and a patch encoder 420 are trainable. The model can be optimized with only the denoising loss of the diffusion model, where the object masks of the input images can be omitted for simplicity.

In various embodiments, the model can be tested without cropping or masking the subject in the images. Identity similarity of the subject can be measured with the similarity of visual features between the input image and the generated image. A reconstruction score can be calculated between each pair of a newly generated image and the input images to evaluate identity preservation. An L2 norm can be used on the embeddings of the newly generated image and the input image to calculate a distance between the two subjects, where a lower distance indicates a greater similarity between the subjects.

Model Training

In various embodiments, the original image set, $X_t$, without cropping out the object region or masking out the background, is regarded as the ground-truth. During training, heavy augmentation, $\mathcal{A}$, can be used to obtain variations of masked images, $X_s$. The training data set may not include paired images of the same subject, so one (1) image may be used to train the model per subject, where N=1 in the training data set. The model can be separately trained for each category.

In various embodiments, during training, for each subject category, the corresponding nouns in the original prompt can be detected, and an identifier inserted. For example, for "person" subject category, the identifier for the nouns that are coarse descriptions of "person", including "man", "woman", "baby", "girl", "boy", "lady", etc. can be inserted. For a "cat" category, the identifier to the nouns, "cat", "kitten" and so on, can be inserted.

In various embodiments, the subject can be encoded into the model, where the input images can be converted into a textual subject embedding. The identifier, $\hat{V}$, indicates the location of the textual embedding. A subject image encoder $E_c$ can be used to map the images to a compact subject feature vector, $f_c$, in the textual space, where $f_c$ is the average feature vector of the global features of all input images. The embedding of identifier, $\hat{V}$, can be replaced with the subject feature vector, $f_c$, to obtain the subject injected textual embedding c. This final embedding can be the condition in the cross-attention layers of the text-to-image diffusion model.

In various embodiments, the loss function used to optimize the model is formulated as:

$$\mathcal{L} = \mathbb{E}_{z,t,c,X_s,\eta \in \mathcal{N}(0,1)}[\|\eta - \eta_\theta(z_t, t, c, X_s)\|_2^2];$$

where $z_t$ is the latent noisy image at time step t obtained from the ground-truth image, $x_t^1$, $\eta$ is the latent noise to predict, c is the textual embedding, $X_s$ is the set of conditioning images, and $\eta_\theta$ is the noise prediction model with parameters $\theta$. The model can be optimized with only the denoising loss of the diffusion model.

In various embodiments, a single denoising step can be used for training, where the training loss can be calculated, as a loss function for an image at a single noise level.

In various embodiments, an image can be generated by obtaining a plurality of input images containing the same subject and an input description of a new depiction of the subject, generating a rich patch feature token and a prompt embedding from the input images and the input description, and generating a new image based on the rich patch feature token and the prompt embedding using an image generation component.

Figure 9:
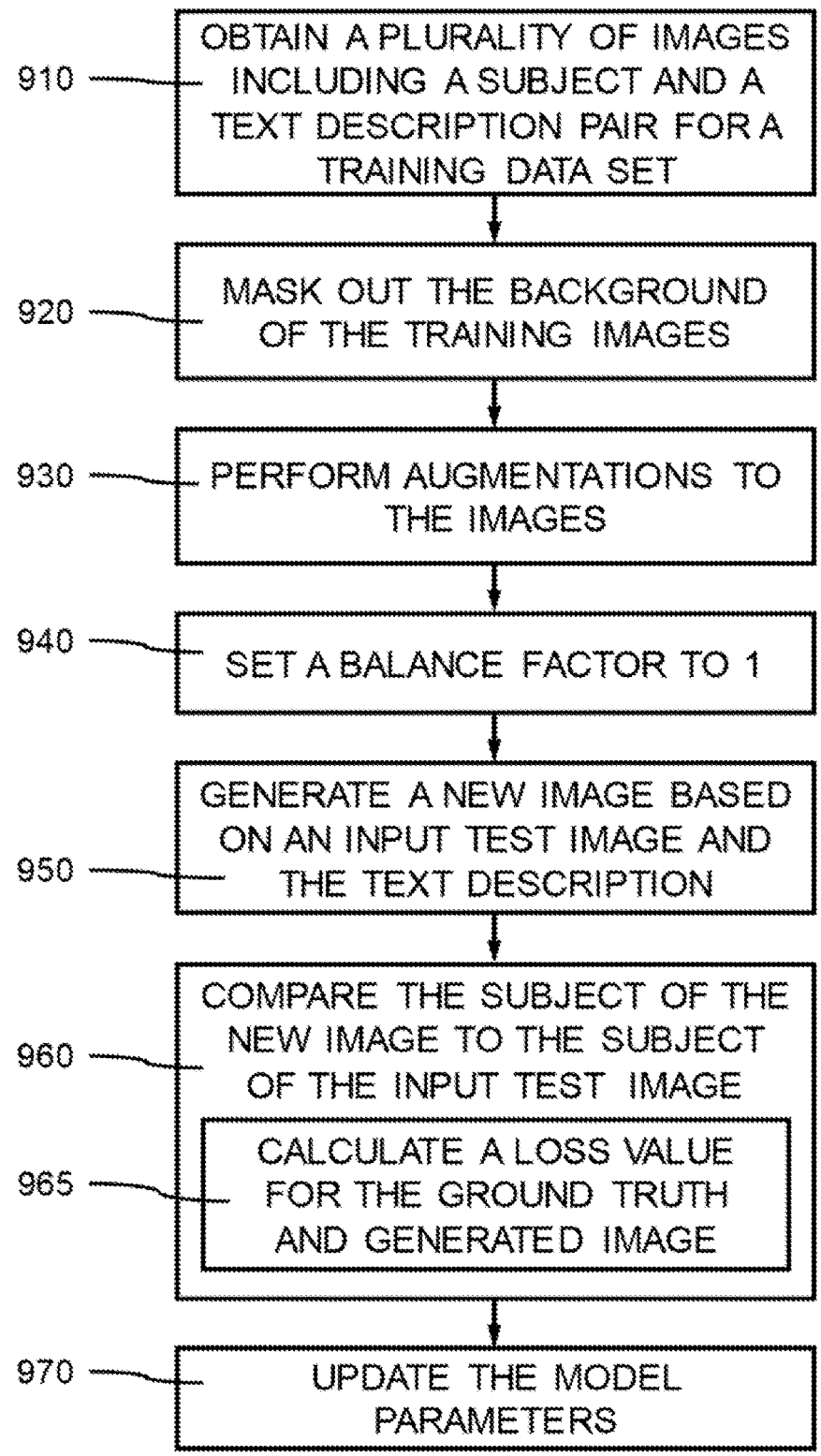
FIG. 9 shows a diagram of an example of a method of training an image generator, according to aspects of the present disclosure.

FIG. 9 shows a diagram of an example of a method of training an image generator, according to aspects of the present disclosure.

At operation 910, a plurality of images can be obtained for a data set, where each training image contains a subject, and a ground truth text description is associated with the image. Each image in the training data set can have a different subject.

In various embodiments, images with multiple objects can be filtered out to simplify the training. Images where the region (e.g., area) ratio of the subject portion belonging to the target subject category is, for example, less than 0.1 or larger than 0.7 of the image area can be filtered out.

At operation 920, the background of the training images can be masked out to increase focus on the subject. During training of a model, the masks are applied to suppress the background content; therefore, the model learns to primarily keep the identity of the foreground object, but not the background.

At operation 930, augmentations can be performed to the training images, where the augmentations can be random. The augmentations can be to obtain variations of masked images $X_s$, where random regional features replaced with a template randomly selected from a templates data set. The masked image set, $X_s$, can be the final image condition to train the model.

At operation 940, the balance factor can be set to one (1) to have a strong reconstruction of the input images with good identity preservation.

At operation 950, noise can be generated by a noise component and added to a training image.

At operation 960, the noise added to the test image can be compared to a ground truth noise map for the training image to obtain a similarity value.

At operation 965, a loss value can be calculated for the comparison of the ground truth and the predicted noise.

At operation 970, the model parameters can be updated to improve the identity preservation ability and vision-language alignment of the model. To evaluate whether the identity can be fully preserved using a default prompt, a reconstruction can be used to measure the similarity of the visual features between the input image and the generated image.

In various embodiments, an image generation model can be trained by obtaining a training data set including a plurality of training images and a text description, generating a new image based on an input test image and the text description using the image generation component, comparing the predicted noise and the ground truth noise, and updating parameters of the image generating component based on the comparison.

In a non-limiting exemplary embodiment, the model is trained for 320 k iterations for person and 200 k iterations for cat, with the learning rate 1e-6 for adapter layers and 1e-4 for the FC layers in the visual encoders, under batch size 16 deployed over 4 A100 GPUs.

Embodiments can utilize a word embedding model to encode a text prompt. A word embedding is a learned representation for text where words that have the same meaning have a similar representation. Glove, Word2Vec, GPT, BERT, and CLIP are examples of systems for obtaining a vector representation of words. GloVe is an unsupervised algorithm for training a network using aggregated global word-word co-occurrence statistics from a corpus. Similarly, a Word2vec model may include a shallow neural network trained to reconstruct the linguistic context of words. GloVe and Word2vec models may take a large corpus of text and produce a vector space as output. In some cases, the vector space may have a large number of dimensions. Each word in the corpus is assigned a vector in the vector space. Word vectors are positioned in the vector space in a manner such that similar words are located nearby in the vector space. In some cases, an embedding space may include syntactic or context information in additional to semantic information for individual words.

Figure 10:
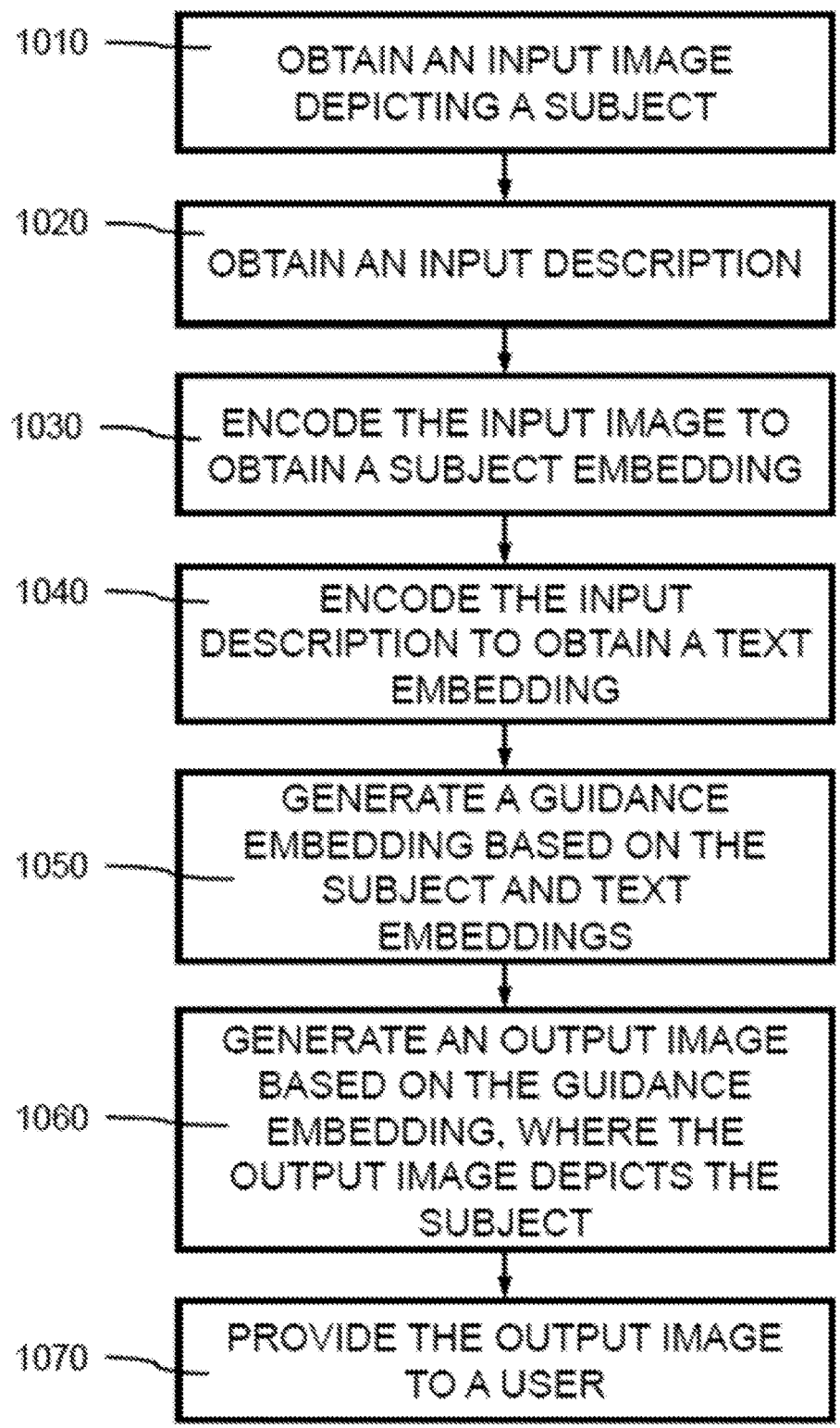
FIG. 10 shows a diagram of an example of a method of generating an image, according to aspects of the present disclosure.

FIG. 10 shows a diagram of an example of a method of generating an image, according to aspects of the present disclosure.

At operation 1010, an input image is obtained, where the input image can be obtained from a user. The input image can be obtained by an image generation model, where the image generation model can include a text encoder, a subject encoder, a patch encoder, and a diffusion model. The diffusion model can include a U-Net having an adapter layer.

At operation 1020, an input description is obtained, where the input description can be a text description of a new image to be generated based on the input image using the image generation model. The input description can be obtained from the user.

At operation 1030, the input image is encoded to obtain a subject embedding, where the subject embedding can be generated by the subject encoder.

At operation 1040, the input description is encoded to obtain a text embedding, where the text embedding can be generated by the text encoder.

At operation 1050, a guidance embedding is generated, where the guidance embedding can be generated based on the subject embedding and the text embedding. The guidance embedding can be generated by combining the subject embedding and the text embedding, where the subject embedding can replace an identifier. The guidance embedding can be a subject injected textual embedding.

At operation 1060, an output image can be generated based on the guidance embedding, where the output image depicts the subject of the input image. The output image can be generated based on the guidance embedding using an image generation model, where the output image depicts the subject and the input description.

At operation 1070, the output image can be provided to the user, where the output image can identifiably depict the subject of the input image in a new arrangement described by the text description.

In various embodiments, the input image can be encoded to obtain a feature embedding, where the feature embedding can be generated by the patch encoder. The feature embedding can be the embeddings, $f_p$, based on the rich patch feature tokens 450 of the image(s) 115.

Figure 11:
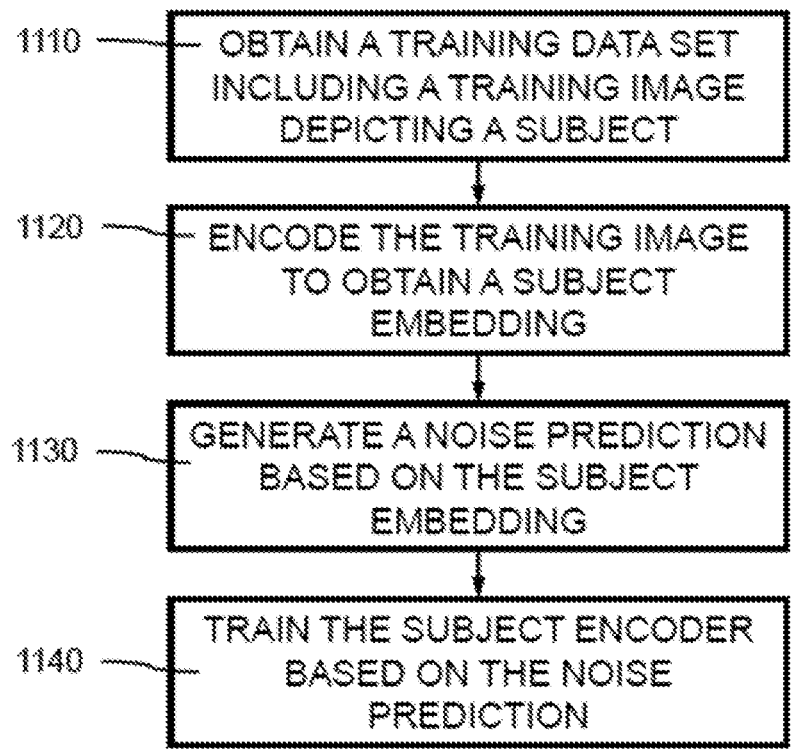
FIG. 11 shows a diagram of an example of a method of training an image generation model, according to aspects of the present disclosure.

FIG. 11 shows a diagram of an example of a method of training an image generation model, according to aspects of the present disclosure.

At operation 1110, a training data set including a training image depicting a subject can be obtained. The training image can be obtained by an image generation model, where the image generation model can include a text encoder, a subject encoder, a patch encoder, and a diffusion model. The diffusion model can include a U-Net having an adapter layer.

At operation 1120, the training image can be encoded to obtain a subject embedding using a subject encoder.

At operation 1130, a noise prediction can be generated based on the subject embedding using the image generation model. The noise prediction can be generated using a diffusion model.

At operation 1140, the subject encoder can be trained based on the noise prediction.

Figure 12:
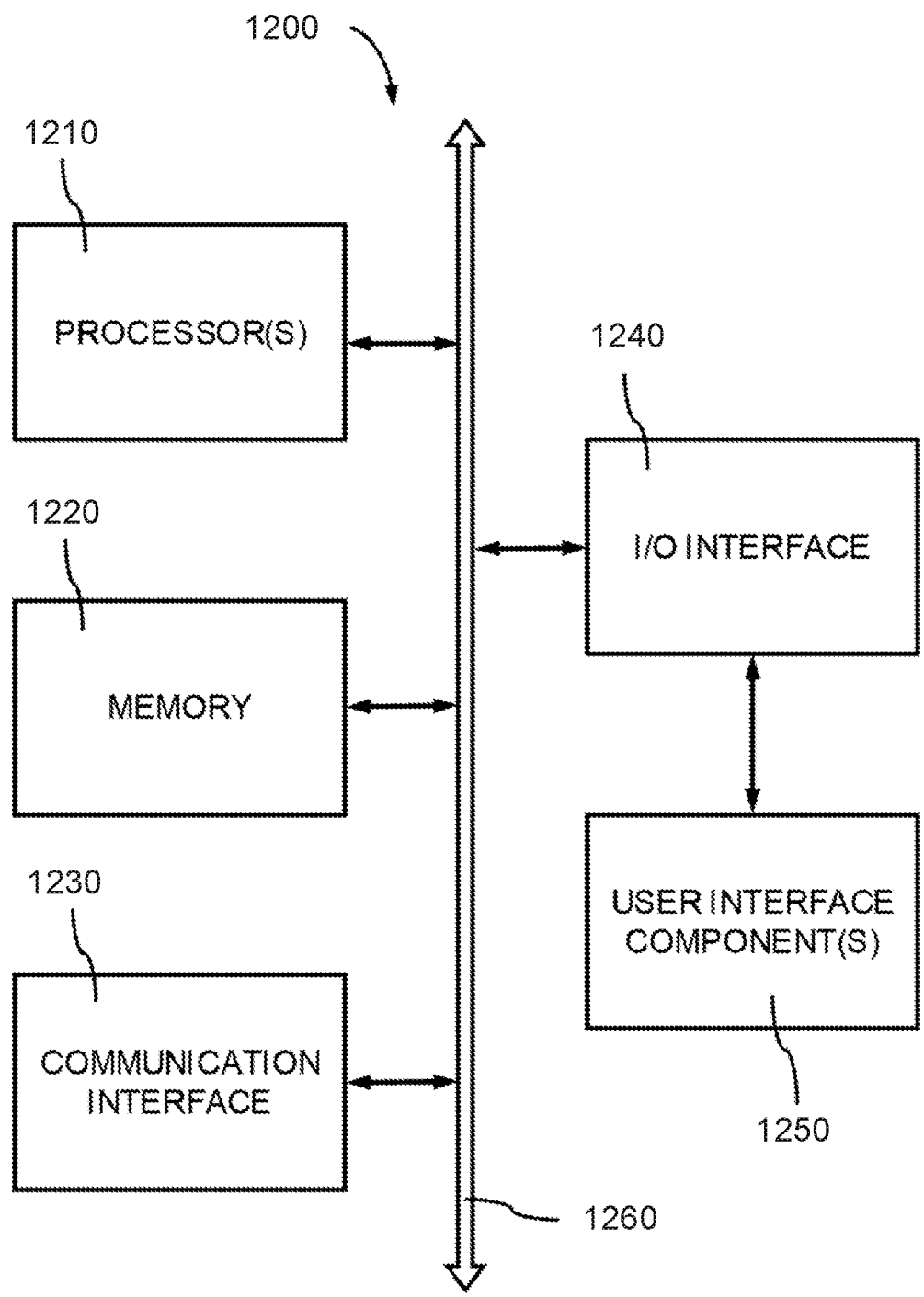
FIG. 12 shows an example of a computing device for image generation, according to aspects of the present disclosure.

FIG. 12 shows an example of a computing device for image generation, according to aspects of the present disclosure.

In various embodiments, the computing device 1200 includes processor(s) 1210, memory subsystem 1220, communication interface 1230, I/O interface 1240, user interface component(s) 1250, and channel 1260.

In various embodiments, computing device 1200 is an example of, or includes aspects of image generation apparatus 120. In some embodiments, computing device 1200 includes one or more processors 1210 that can execute instructions stored in memory subsystem 1220 for generating a new image of an identifiable subject from an input image and a text description.

In various embodiments, computing device 1200 includes one or more processors 1210. In various embodiments, a processor 1210 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1210 is configured to operate a memory array using a memory controller. In other cases, a memory controller is integrated into a processor. In some cases, a processor is configured to execute computer-readable instructions stored in a memory to perform various functions. In some embodiments, a processor 1210 includes special-purpose components for modem processing, baseband processing, digital signal processing, or transmission processing.

A processor 1210 may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor 1210, the functions may be stored in the form of instructions or code on a computer-readable medium.

In various embodiments, memory subsystem 1220 includes one or more memory devices. Examples of a memory device include random access memory (RAM), read-only memory (ROM), or a hard disk. Examples of memory devices 1220 include solid state memory and a hard disk drive. In some examples, memory is used to store computer-readable, computer-executable software including instructions that, when executed, cause a processor 1010 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1230 operates at a boundary between communicating entities (such as computing device 1200, one or more user devices, a cloud, and one or more databases) and channel 1260 (e.g., bus), and can record and process communications. In some cases, communication interface 1230 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1240 is controlled by an I/O controller to manage input and output signals for computing device 1200. In some cases, I/O interface 1240 manages peripherals not integrated into computing device 1200. In some cases, I/O interface 1240 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1240 or via hardware components controlled by the I/O controller.

According to some aspects, user interface component(s) 1250 enable a user to interact with computing device 1200. In some cases, user interface component(s) 1250 include an audio device, such as an external speaker system, an external display device such as a display device 390 (e.g., screen), an input device (e.g., a remote-control device interfaced with a user interface directly or through the I/O controller), or a combination thereof. In some cases, user interface component(s) 1250 include a GUI.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of generating an image, comprising:
obtaining an input description and an input image depicting a subject;
encoding the input description using a text encoder of an image generation model to obtain a text embedding;
encoding the input image using a subject encoder of the image generation model to obtain a subject embedding;
generating a guidance embedding by combining the subject embedding and the text embedding; and
generating an output image based on the guidance embedding using a diffusion model of the image generation model, wherein the output image depicts one or more aspects of the input image and the input description.

2. The method of claim 1, wherein:
the guidance embedding is generated by replacing an identifier in the text embedding with the subject embedding.

3. The method of claim 1, further comprising:
encoding the input image to obtain a feature embedding representing a subject identity of the input image, wherein the output image is generated based on the feature embedding.

4. The method of claim 3, further comprising:
introducing the feature embedding into an adapter layer of the image generation model to preserve the subject identity in the output image.

5. The method of claim 1, wherein:
the text embedding is generated using a first multi-modal encoder and the subject embedding is generated using a second multi-modal encoder.

6. The method of claim 1, further comprising:
applying a balance factor and a renormalization factor to the subject embedding.

7. The method of claim 6, wherein:
the balance factor is less than 1.

* * * * *